United States Patent
Chroszicl et al.

(10) Patent No.: US 10,673,879 B2
(45) Date of Patent: Jun. 2, 2020

(54) SNAPSHOT OF A FORENSIC INVESTIGATION FOR ENTERPRISE THREAT DETECTION

(71) Applicant: SAP SE, Walldorf (DE)

(72) Inventors: Florian Chroszicl, St. Leon-Rot (DE);
Jona Hassforther, Heidelberg (DE);
Thomas Kunz, Lobbach/Lobenfeld (DE); Harish Mehta, Wiesenbach (DE); Rita Merkel, Ilvesheim (DE);
Kathrin Nos, Nussloch (DE); Wei-Guo Peng, Dallau (DE); Eugen Pritzkau, Wiesloch (DE); Marco Rodeck, Maikammer (DE); Hartwig Seifert, Elchesheim-Illingen (DE); Nan Zhang, Schriesheim (DE); Thorsten Menke, Bad Iburg (DE); Hristina Dinkova, Nussloch (DE); Lin Luo, Wiesloch (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 15/274,569

(22) Filed: Sep. 23, 2016

(65) Prior Publication Data

US 2018/0091535 A1    Mar. 29, 2018

(51) Int. Cl.
| | |
|---|---|
| *H04L 29/06* | (2006.01) |
| *G06F 16/11* | (2019.01) |
| *G06F 11/30* | (2006.01) |
| *G06F 21/00* | (2013.01) |
| *G06Q 10/06* | (2012.01) |

(Continued)

(52) U.S. Cl.
CPC .......... *H04L 63/1425* (2013.01); *G06F 11/30* (2013.01); *G06F 11/302* (2013.01); *G06F 11/3051* (2013.01); *G06F 11/323* (2013.01); *G06F 16/128* (2019.01);
(Continued)

(58) Field of Classification Search
CPC .......... H04L 63/1425; G06F 17/30088; G06F 17/30418; G06F 17/30589
See application file for complete search history.

(56) References Cited

U.S. PATENT DOCUMENTS

| | | |
|---|---|---|
| 5,440,726 A | 8/1995 | Fuchs |
| 5,960,170 A | 9/1999 | Chen |

(Continued)

OTHER PUBLICATIONS

Office Action in related U.S. Appl. No. 15/216,201 dated Mar. 7, 2018; 14 pages.

(Continued)

*Primary Examiner* — Techane Gergiso
(74) *Attorney, Agent, or Firm* — Fish & Richardson P.C.

(57) ABSTRACT

An enterprise threat detection (ETD) forensic workspace is established according to a particular timeframe and permitting defining a selection of data types from available log data for an evaluation of events associated with one or more entities. A chart is defined illustrating a graphical distribution of a particular data type in the forensic workspace. A snapshot associated with the chart is generated, the snapshot saving a copy of all data necessary to re-create the chart into an associated snapshot object. The snapshot is associated with a snapshot page for containing the snapshot and the snapshot page is saved within the ETD forensic workspace.

20 Claims, 5 Drawing Sheets

(51) Int. Cl.
*G06F 16/248* (2019.01)
*G06F 11/32* (2006.01)

(52) U.S. Cl.
CPC ............ *G06F 16/248* (2019.01); *G06F 21/00* (2013.01); *G06Q 10/0635* (2013.01); *G06F 2201/865* (2013.01)

(56) References Cited

U.S. PATENT DOCUMENTS

| | | | |
|---|---|---|---|
| 6,173,418 B1 | 1/2001 | Fujino et al. | |
| 6,629,106 B1 | 9/2003 | Narayanaswamy | |
| 6,779,001 B1 | 8/2004 | Kanai et al. | |
| 7,376,969 B1 | 5/2008 | Njemanze | |
| 7,380,205 B2 | 5/2008 | Bezrukov et al. | |
| 7,441,197 B2 | 10/2008 | Tschiegg et al. | |
| 7,457,792 B2 | 11/2008 | Weigt et al. | |
| 7,457,793 B2 | 11/2008 | Weigt et al. | |
| 7,457,794 B2 | 11/2008 | Weigt et al. | |
| 7,545,969 B2 * | 6/2009 | Bennett ................. | G01N 21/33 250/365 |
| 7,624,092 B2 | 11/2009 | Lieske et al. | |
| 7,627,544 B2 * | 12/2009 | Chkodrov ............. | G06Q 10/10 703/17 |
| 7,756,808 B2 | 7/2010 | Weigt et al. | |
| 7,756,809 B2 | 7/2010 | Weigt et al. | |
| 7,761,396 B2 | 7/2010 | Weigt et al. | |
| 7,783,723 B2 | 8/2010 | Peng et al. | |
| 7,788,718 B1 | 8/2010 | Fei | |
| 7,872,982 B2 | 1/2011 | Atkins | |
| 7,908,660 B2 | 3/2011 | Bahl | |
| 7,934,257 B1 | 4/2011 | Kienzle | |
| 7,961,633 B2 | 6/2011 | Shankar | |
| 7,971,209 B2 | 6/2011 | Eberlein et al. | |
| 8,051,034 B2 | 11/2011 | Mehta et al. | |
| 8,091,117 B2 | 1/2012 | Williams | |
| 8,474,047 B2 | 6/2013 | Adelstein | |
| 8,484,726 B1 | 7/2013 | Sutton | |
| 8,554,907 B1 | 10/2013 | Chen et al. | |
| 8,661,103 B2 | 2/2014 | Mehta et al. | |
| 8,775,671 B2 | 7/2014 | Rodeck et al. | |
| 8,892,454 B2 | 11/2014 | Rabetge et al. | |
| 8,954,602 B2 | 2/2015 | Seifert et al. | |
| 8,973,147 B2 | 3/2015 | Pearcy | |
| 9,037,678 B2 | 5/2015 | Mehta et al. | |
| 9,075,633 B2 | 7/2015 | Nos | |
| 9,106,697 B2 | 8/2015 | Capalik et al. | |
| 9,116,906 B2 | 8/2015 | Nos et al. | |
| 9,148,488 B2 | 9/2015 | Rabetge et al. | |
| 9,170,951 B1 | 10/2015 | He | |
| 9,251,011 B2 | 2/2016 | Meier et al. | |
| 9,262,519 B1 | 2/2016 | Saurabh | |
| 9,304,978 B2 | 4/2016 | Bezrukov et al. | |
| 9,313,421 B2 | 4/2016 | Deshpande | |
| 9,336,385 B1 | 5/2016 | Spencer | |
| 9,348,665 B2 | 5/2016 | Storz et al. | |
| 9,383,934 B1 * | 7/2016 | Lukacs ................. | G06F 3/0622 |
| 9,419,989 B2 | 8/2016 | Harris | |
| 9,524,389 B1 * | 12/2016 | Roth .................... | G06F 21/554 |
| 9,619,984 B2 | 4/2017 | Donovan | |
| 9,690,931 B1 | 6/2017 | Anantharaju et al. | |
| 9,779,147 B1 | 10/2017 | Sherman et al. | |
| 9,779,150 B1 | 10/2017 | Sherman | |
| 9,843,596 B1 | 12/2017 | Avelbuch | |
| 9,979,741 B2 | 5/2018 | Fuhrman | |
| 1,000,138 A1 | 6/2018 | Das et al. | |
| 10,079,842 B1 * | 9/2018 | Brandwine ......... | H04L 63/1416 |
| 1,010,237 A1 | 10/2018 | Seifert et al. | |
| 10,140,447 B2 | 11/2018 | Rahaman et al. | |
| 10,148,675 B1 * | 12/2018 | Brandwine ......... | H04L 63/1416 |
| 2002/0070953 A1 | 6/2002 | Barg | |
| 2003/0074471 A1 | 4/2003 | Anderson | |
| 2003/0115484 A1 | 6/2003 | Mariconi et al. | |
| 2003/0217137 A1 | 11/2003 | Roese | |
| 2004/0015481 A1 | 1/2004 | Zinda | |
| 2004/0044912 A1 | 3/2004 | Connary | |
| 2004/0078490 A1 | 4/2004 | Anderson | |
| 2004/0093513 A1 | 5/2004 | Cantrell | |
| 2006/0037075 A1 | 2/2006 | Frattura | |
| 2006/0059115 A1 | 3/2006 | Gulfleisch et al. | |
| 2006/0106847 A1 | 5/2006 | Eckardt et al. | |
| 2006/0161816 A1 | 7/2006 | Gula et al. | |
| 2006/0218140 A1 | 9/2006 | Whitney | |
| 2006/0253907 A1 | 11/2006 | McConnell | |
| 2007/0073519 A1 | 3/2007 | Long | |
| 2007/0100905 A1 * | 5/2007 | Masters ................ | G06F 21/568 |
| 2007/0115998 A1 | 5/2007 | McEligott | |
| 2007/0136437 A1 | 6/2007 | Shankar et al. | |
| 2007/0150596 A1 | 6/2007 | Miller et al. | |
| 2007/0183389 A1 | 8/2007 | Clee | |
| 2007/0186284 A1 | 8/2007 | McConnell | |
| 2007/0266387 A1 | 11/2007 | Henmi | |
| 2007/0283192 A1 * | 12/2007 | Shevchenko ......... | G06F 21/554 714/39 |
| 2007/0300296 A1 | 12/2007 | Kudla | |
| 2008/0033966 A1 | 2/2008 | Wahl | |
| 2008/0034425 A1 | 2/2008 | Overcash et al. | |
| 2008/0080384 A1 | 4/2008 | Atkins | |
| 2008/0091681 A1 | 4/2008 | Dwivedi | |
| 2008/0163085 A1 | 7/2008 | Subbu et al. | |
| 2008/0288889 A1 | 11/2008 | Hunt et al. | |
| 2008/0295173 A1 | 11/2008 | Tsvetanov | |
| 2008/0320552 A1 | 12/2008 | Kumar | |
| 2009/0044277 A1 | 2/2009 | Aaron et al. | |
| 2009/0049518 A1 | 2/2009 | Roman | |
| 2009/0288164 A1 * | 11/2009 | Adelstein ............. | H04L 63/123 726/22 |
| 2009/0293046 A1 | 11/2009 | Cheriton | |
| 2009/0300045 A1 | 12/2009 | Chaudhry et al. | |
| 2009/0312026 A1 | 12/2009 | Parameswar | |
| 2010/0011031 A1 | 1/2010 | Huang | |
| 2010/0114832 A1 * | 5/2010 | Lillibridge ........ | G06F 17/30088 707/649 |
| 2010/0180325 A1 | 7/2010 | Golobay | |
| 2011/0098928 A1 | 4/2011 | Hoffman et al. | |
| 2011/0213741 A1 | 9/2011 | Shama | |
| 2011/0277034 A1 | 11/2011 | Hanson | |
| 2011/0320816 A1 | 12/2011 | Yao | |
| 2012/0005542 A1 | 1/2012 | Petersen | |
| 2012/0158653 A1 | 6/2012 | Shaffer et al. | |
| 2012/0167161 A1 | 6/2012 | Kim et al. | |
| 2012/0191660 A1 * | 7/2012 | Hoog .................... | G06F 21/552 707/661 |
| 2012/0210434 A1 | 8/2012 | Curtis et al. | |
| 2012/0271748 A1 | 10/2012 | DiSalvo | |
| 2012/0271790 A1 | 10/2012 | Lappas et al. | |
| 2012/0317078 A1 | 12/2012 | Zhou et al. | |
| 2013/0086023 A1 | 4/2013 | Tsukamoto et al. | |
| 2013/0106830 A1 | 5/2013 | de Loera | |
| 2013/0198840 A1 | 8/2013 | Drissi et al. | |
| 2013/0212709 A1 * | 8/2013 | Tucker .................. | G06F 21/55 726/29 |
| 2013/0262311 A1 | 10/2013 | Buhrmann | |
| 2013/0298243 A1 * | 11/2013 | Kumar .................. | G06F 21/52 726/25 |
| 2013/0304665 A1 | 11/2013 | Rodeck et al. | |
| 2013/0304666 A1 | 11/2013 | Rodeck et al. | |
| 2013/0305369 A1 | 11/2013 | Karta | |
| 2013/0326079 A1 | 12/2013 | Seifert et al. | |
| 2013/0347111 A1 * | 12/2013 | Karta .................. | H04L 63/1441 726/23 |
| 2014/0047413 A1 | 2/2014 | Shelve et al. | |
| 2014/0201836 A1 * | 7/2014 | Amsler ............... | H04L 63/1425 726/23 |
| 2014/0223283 A1 | 8/2014 | Hancock | |
| 2014/0244623 A1 | 8/2014 | King | |
| 2014/0317681 A1 * | 10/2014 | Shende .................. | H04L 63/10 726/1 |
| 2015/0007325 A1 | 1/2015 | Eliseev | |
| 2015/0067880 A1 | 3/2015 | Ward | |
| 2015/0073868 A1 | 3/2015 | Garman | |
| 2015/0106867 A1 | 4/2015 | Liang | |
| 2015/0143521 A1 | 5/2015 | Eliseev | |

(56) References Cited

U.S. PATENT DOCUMENTS

| | | |
|---|---|---|
| 2015/0154524 A1 | 6/2015 | Borodow |
| 2015/0180891 A1 | 6/2015 | Seward |
| 2015/0215329 A1* | 7/2015 | Singla ................ H04L 63/1416 726/23 |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1* | 12/2015 | Mumcuoglu ......... G06F 21/552 726/23 |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1* | 10/2016 | Marron ................. G06F 11/362 |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1* | 12/2016 | Lee ................... G06F 17/30858 |
| 2016/0364740 A1 | 12/2016 | Parker |
| 2016/0373476 A1 | 12/2016 | Dell'anno et al. |
| 2016/0378978 A1 | 12/2016 | Singla |
| 2016/0381049 A1 | 12/2016 | Lakhani |
| 2017/0004005 A1 | 1/2017 | Elliott |
| 2017/0026400 A1 | 1/2017 | Adams et al. |
| 2017/0031002 A1 | 2/2017 | Newton et al. |
| 2017/0034023 A1 | 2/2017 | Nickolov |
| 2017/0070415 A1 | 3/2017 | Bell et al. |
| 2017/0091008 A1* | 3/2017 | Cherbakov .......... G06F 11/079 |
| 2017/0093902 A1 | 3/2017 | Roundy et al. |
| 2017/0148060 A1 | 5/2017 | Showers |
| 2017/0169217 A1 | 6/2017 | Rahaman |
| 2017/0251365 A1 | 8/2017 | Burchard |
| 2017/0270006 A1* | 9/2017 | Kandylas ........... G06F 11/1446 |
| 2017/0279837 A1 | 9/2017 | Dasgupta |
| 2017/0287179 A1 | 10/2017 | Tibshirani et al. |
| 2017/0302685 A1* | 10/2017 | Ladnai ................ H04L 63/1416 |
| 2017/0308602 A1 | 10/2017 | Raghunathan et al. |
| 2017/0316026 A1 | 11/2017 | Kanthak et al. |
| 2017/0322993 A1 | 11/2017 | Brodt et al. |
| 2017/0324766 A1 | 11/2017 | Gonzalez |
| 2018/0027002 A1 | 1/2018 | Rodeck et al. |
| 2018/0027010 A1 | 1/2018 | Pritzkau et al. |
| 2018/0059876 A1 | 3/2018 | Peng et al. |
| 2018/0063167 A1 | 3/2018 | Rodeck |
| 2018/0091535 A1* | 3/2018 | Chrosziel ............ H04L 63/1425 |
| 2018/0091536 A1 | 3/2018 | Chrosziel et al. |
| 2018/0157835 A1 | 6/2018 | Nos |
| 2018/0173872 A1 | 6/2018 | Lam et al. |
| 2018/0173873 A1 | 6/2018 | Hassforther et al. |
| 2018/0176234 A1 | 6/2018 | Kunz et al. |
| 2018/0176235 A1 | 6/2018 | Lam et al. |
| 2018/0176238 A1 | 6/2018 | Nos et al. |
| 2018/0234447 A1 | 8/2018 | Mueen |
| 2019/0005423 A1 | 1/2019 | Pritzkau et al. |
| 2019/0007435 A1 | 1/2019 | Pritzkau et al. |

OTHER PUBLICATIONS

U.S. Office Action in related U.S. Appl. No. 15/274,693 dated Feb. 11, 2019, 13 pages.

U.S. Office Action in related U.S. Appl. No. 15/274,693 dated Jul. 26, 2018, 14 pages.

U.S. Office Action in related U.S. Appl. No. 15/216,201 dated Jul. 20, 2018, 15 pages.

U.S. Office Action in related U.S. Appl. No. 15/253,438 dated Sep. 19, 2018, 17 pages.

U.S. Office Action in related U.S. Appl. No. 15/246,053 dated May 21, 2018, 14 pages.

U.S. Office Action in related U.S. Appl. No. 15/246,053 dated Sep. 24, 2018, 14 pages.

U.S. Office Action in related U.S. Appl. No. 15/370,084 dated Aug. 27, 2018, 14 pages.

U.S. Office Action in related U.S. Appl. No. 15/370,084 dated Feb. 4, 2019, 9 pages.

U.S. Office Action in related U.S. Appl. No. 15/380,450 dated Aug. 27, 2018, 19 pages.

U.S. Office Action in related U.S. Appl. No. 15/380,450 dated Jan. 23, 2019, 21 pages.

U.S. Office Action in related U.S. Appl. No. 15/380,450 dated Nov. 2, 2018, 19 pages.

U.S. Office Action in related U.S. Appl. No. 15/380,379 dated Jul. 19, 2018, 9 pages.

U.S. Office Action in related U.S. Appl. No. 15/381,567 dated Nov. 2, 2018, 17 pages.

U.S. Office Action in related U.S. Appl. No. 15/383,771 dated Aug. 3, 2018, 12 pages.

U.S. Office Action in related U.S. Appl. No. 15/383,771 dated Jan. 23, 2019, 14 pages.

Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.

Office Action issued in U.S. Appl. No. 15/847,478, dated Aug. 6, 2019, 36 pages.

Non-Final Office Action issued in U.S. Appl. No. 15/639,863 dated Jun. 24, 2019, 37 pages.

U.S. Office Action in related U.S. Appl. No. 15/383,771 dated Jul. 5, 2019, 16 pages.

Final office action issued in U.S. Appl. No. 15/639,863 dated Dec. 20, 2019, 32 pages.

* cited by examiner

SNAPSHOT OF A FORENSIC INVESTIGATION FOR ENTERPRISE THREAT DETECTION

BACKGROUND

Typical ETD systems permit browsing through different paths of collected log data, by applying filters and data set (for example, log files) operations, and to narrow down a suspected potential threat to an enterprise computing system (for example, the ETD system might generate detailed charts, graphs, informational dialogs, etc. to alert a user of an ETD threat). If a threat to the enterprise computing system is found, it is often advantageous/necessary to share the information with colleagues associated with other functional areas within the enterprise to obtain further confirmation or support. Additionally, responsible managers in affected/potentially affected areas of the enterprise need regular reports about potential enterprise threats, including found cases and statistics, to assist with mitigation and prevention efforts. The sharing of information is currently typically accomplished through email or other messaging tools, screenshots, telephone, etc. These methods of sharing information are cumbersome, inefficient, and provide incomplete information needed for ETD efforts.

SUMMARY

The present disclosure describes methods and systems, including computer-implemented methods, computer program products, and computer systems for generating a snapshot of an enterprise threat detection (ETD) forensic investigation.

In an implementation, an enterprise threat detection (ETD) forensic workspace is established according to a particular timeframe and permitting defining a selection of data types from available log data for an evaluation of events associated with one or more entities. A chart is defined illustrating a graphical distribution of a particular data type in the forensic workspace. A snapshot associated with the chart is generated, the snapshot saving a copy of all data necessary to re-create the chart into an associated snapshot object. The snapshot is associated with a snapshot page for containing the snapshot and the snapshot page is saved within the ETD forensic workspace.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations so as to realize one or more of the following advantages. First, it is currently not possible in ETD to generate a snapshot of an ETD forensic investigation. The described subject matter relates to functionality to generate and use a persistent snapshot in an ETD forensic investigation. Second, with the described solution, potential threats occurring in any timeframe covered by a snapshot can be documented, shared with colleagues for further investigation, or saved/archived as retrievable data/evidence of a particular threat or threats to an enterprise computing system. Third, one or more snapshots can be organized into one logical snapshot group/page. This snapshot organization, particularly with respect to multiply-grouped snapshots, permits analysis of potential threats occurring at a certain time to be viewed from different contextual angles, aspects, etc. by analyzing one or more snapshots applicable to the contextual-goal of the snapshot page. Fourth, comments or annotations associated with a snapshot enable an exchange of opinions and discussions. This shared information helps in the identification of and determination of a particular enterprise threat and associated seriousness, respectively. An appropriate mitigation plan can then be followed to address the particular enterprise threat. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
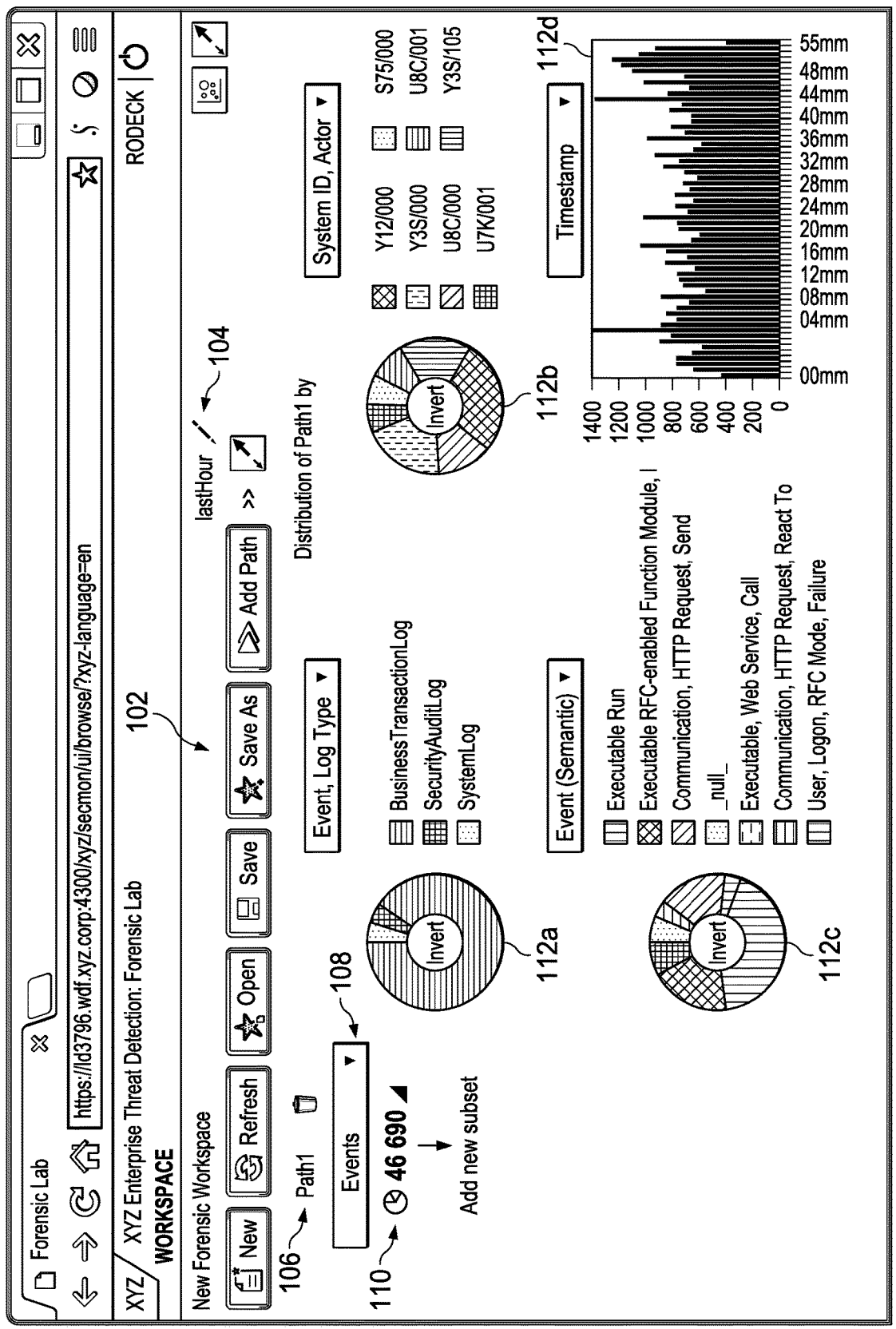
FIG. 1 is a screenshot of an example enterprise threat detection (ETD) forensic lab user interface 100, according to an implementation.

The following detailed description describes generating a snapshot of an enterprise threat detection (ETD) forensic investigation, and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Typical ETD systems permit browsing through different paths of collected log data, by applying filters and data set (for example, log files) operations, and to narrow down a suspected potential threat to an enterprise computing system (for example, the ETD system might generate detailed charts, graphs, informational dialogs, etc. to alert a user of an ETD threat). If a threat to the enterprise computing system is found, it is often advantageous/necessary to save the data to provide proof for the determination an ETD threat was made and to share the information with colleagues associated with other functional areas within the enterprise to obtain further confirmation or support. Additionally, responsible managers in affected/potentially affected areas of the enterprise need regular reports about potential enterprise threats, including found cases and statistics, to assist with mitigation and prevention efforts. The sharing of information is currently typically accomplished through email or other messaging tools, screenshots, telephone, etc. These methods of sharing information are cumbersome, inefficient, and provide incomplete information needed for ETD efforts.

The subject matter described in this specification can be implemented in particular implementations so as to realize one or more of the following advantages. First, it is currently not possible in ETD to generate a snapshot of an ETD forensic investigation. The described subject matter relates to functionality to generate and use a persistent snapshot in an ETD forensic investigation. Second, with the described solution, potential threats occurring in any timeframe covered by a snapshot can be documented, shared with colleagues, and saved/archived as retrievable data/evidence of a particular threat or threats to an enterprise computing system. Third, one or more snapshots can be organized into one logical snapshot group/page (hereafter, a "snapshot page"). This snapshot organization, particularly with respect to multiply-grouped snapshots, permits analysis of potential threats occurring at a certain time to be viewed from different contextual angles, aspects, etc. by analyzing one or more snapshots applicable to the contextual goal of the snapshot page. Fourth, comments or annotations associated with a snapshot enable an exchange of opinions and discussions. This shared information helps in the identification of and determination of a particular enterprise threat and associated seriousness, respectively. An appropriate mitigation plan can then be followed to address the particular enterprise threat.

At a high-level, functionality is described permitting generation of a snapshot of ETD data, associated with a particular time stamp, which can be used to determine whether a threat or threats to an enterprise computing system exists.

As mentioned above, the snapshot can be shared (for example, using a uniform resource locator (URL) or other identifier to access/identify a particular snapshot) between different contributors (for example, individuals, teams, functional groups, response teams, and the like) and saved/archived (for example, bookmarking or persisting in a database). A snapshot is interactive in nature. As such, the use of the described snapshot overcomes disadvantages present in static screenshots, transitory telephone conversations, distributed/disjointed email/messaging communications, etc. (for example, a snapshot can be annotated and persisted by one or more of the above-described different contributors to permit ETD analysis to be a collaborative-type effort, etc.).

In typical implementations, one or more snapshots are associated with a graphical user interface (GUI) snapshot page to assist users with accessing and working with aspects of a particular snapshot (or a logical group of snapshots). A particular snapshot page can be configured with a title, detailed description, section for associated annotations/notes, etc. A snapshot page can be also be shared and saved/archived in a manner similar to that described with respect to a snapshot (that is, the snapshot page and all associated data used to generate the snapshot page).

FIG. 1 is a screenshot of an example ETD forensic lab user interface 100, according to an implementation. On the left side, user interface 100 permits the user to open a new forensic workspace 102 according to a particular timeframe 104 and for defined path 106 (here "Path 1"). For the purposes of this disclosure, a path contains a series of filters. Starting with a "complete" set of log data (a particular chosen data source) for analysis, after creating a path, a particular subset of log data under analysis should remain. The application of a new filter in a path results in a new subset, which is necessarily at least equal to or smaller than a previous set/subset. Multiple logs can be analyzed in a single path. Associated with the path 106, a selection 108 can be made of particular data type (currently "Events" is shown as the selection) permitting an evaluation of events associated with one or more entities. Other example data types that can be selected include "Health Check" (where network PING checks are regularly performed to determine if all connected systems are still available or "Alert" (alerts generated by ETD pattern execution). Entities can include, for example, systems, users, etc. An overall count 110 of the number available events is displayed. In typical implementations, the overall count 110 is also selectable (small arrow to the lower right of the count number). By clicking the small arrow, a pulldown will be shown that allows the creation of an ETD pattern, creation of a chart, displaying raw data of the current subset, creation of a snapshot page, etc. Other UI controls (not illustrated) can also be configured to allow creation of a snapshot based on the currently selected data (based on the path 106).

On the right side of user interface 100, user options to distribute various selectable dimensions of the set of log data. Each displayed chart is independent and provides a distributed view of the current subset of log data based on the selected path. For example, the charts (here, "Event, Log Type" 112a, "System ID, Actor" 112b, "Event (Semantic)" 112c, and "Timestamp" 112d). Here the four charts mean that the current subset with 46,690 log events can be distributed by "Event, Log Type," "System ID, Actor," "Event (Semantic)," and "Timestamp." In some implementations, initial distributions (the number depending on, for example, display size, data types available, etc.) can be preselected based on any relevant criteria consistent with this disclosure.

In some implementations, the user can change/configure the initial, pre-selections to view other distributions. In some implementations, changing the path can automatically change the selected distributions to reflect the updated subset of data (for example, a particular filter or series of filters, can be analyzed and particular distribution selections selected for rendering). In some implementations, the right side of UI 100 can be scrolled to permit addition (for example, using a user interface element—not illustrated) or visualization of other available distributions that may be "off the display." In some implementations, the visualizations can be set to none to remove them from the display or removed (for example, using a user interface element—not illustrated).

Figure 2:
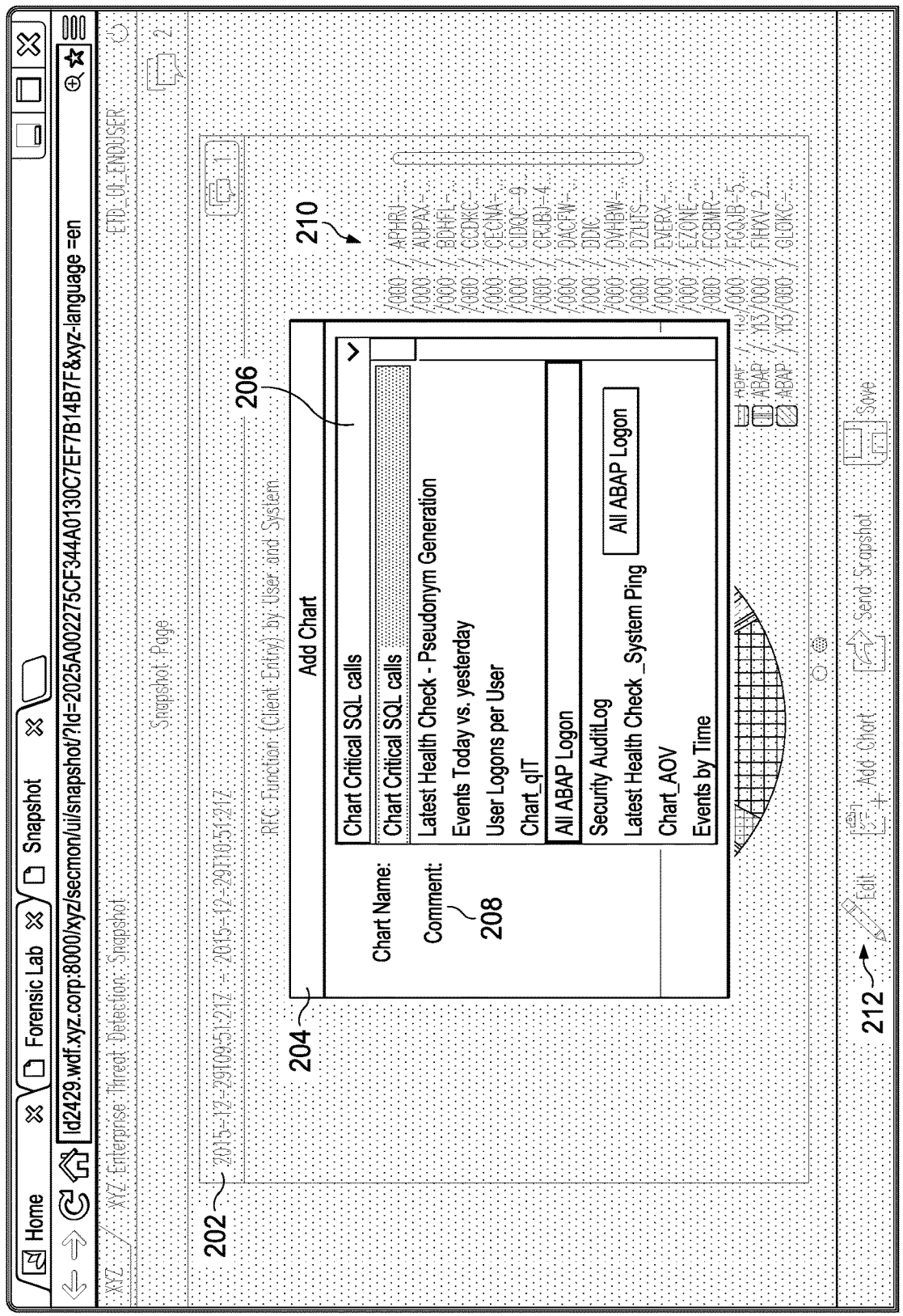
FIG. 2 is a screenshot of a snapshot page illustrating functionality to add a snapshot representing a particular view/distribution of data (represented by a snapshot object) associated with the snapshot page, according to an implementation.

FIG. 2 is a screenshot of a snapshot page 200 illustrating functionality to add a snapshot representing a particular view/distribution of data (represented by a snapshot object) associated with the snapshot page, according to an implementation. Note that "chart," "snapshot," "snapshot object," etc. may be used interchangeably depending upon context. The snapshot page 200 can be thought of as a framework that can be used to attach one or more snapshots in order to enhance understanding, emphasize correlations/associations, preserve particular data, etc. for ETD functionality. A snapshot object can also contain an ETD pattern permitting selection/re-selection of a particular data distribution, but also including additional values, such as thresholds, etc. used by ETD functionality.

When a snapshot operation is performed (for example, following a SELECT operation to generate a particular chart), the ETD system gathers and persists all data necessary (for example, in a separate data store) in a frozen copy of data to preserve and re-create the particular chart. For example, all appropriate logs, environmental variable/conditions, chart data/UI information, selected path/filter data, any other associated data, and functionality to search for the same configurations at a different timeframe is copied and saved as part of a snapshot object. Note that a workspace (for example, workspace 102 of FIG. 1) can be created with relative timeframe. A chart to be included in a snapshot could have a relative timeframe. After the chart is associated with a particular snapshot, the relative timeframe is converted into a timeframe and saved together with its snapshot.

Once a snapshot is generated, associated data is typically considered immutable/read-only for security reasons. In this case, any changes to an overall snapshot would require saving the edited snapshot as a new snapshot. Some implementations can permit edits (with appropriate permissions/authorization and logging of activities) to be made to a snapshot.

A persisted snapshot object permits re-creation of a chart of a particular situation being analyzed even if the original associated data persisted by a snapshot object is archived, deleted, or damaged. To re-create a particular chart, a saved SELECT is generally re-run on the associated and persisted data. As an example of this functionality, if a chart is generated with a particular timeframe (say 0900-1000) on a particular date, a UI associated with a chart can provide interactive functionality (for example, both UI and underlying logic) to permit a user to select a different timeframe—such as one, two, or six months or 1 year ago. For example, selecting a particular chart can result in a GUI pop-up dialog requesting a different time frame.

In this scenario, the ETD system can re-select data (using the selection criteria retrieved from the snapshot object the chart is associated with) based on the new timeframe (to the degree the data may be available) and provide a new chart reflecting the appropriate data to compare to original chart. In other implementations, the ETD system can overlay or offset, etc. the new data over the prior data (for example, using a different color, rendering opaque UI elements, etc.) to provide a more intuitive and direct comparison. Other similar comparison techniques are considered to be within the scope of this disclosure.

A snapshot page can be considered a separate data container, which is persisted together with a reference to associated snapshot objects. Here, technically an id and timeframe of an individual chart or ETD pattern definition (which includes other properties) is saved as an associated snapshot (as the chart or ETD pattern definition is associated with a snapshot object). This data can then be stored within a forensic lab workspace. If a named snapshot page is accessed, the saved snapshot page plus associated snapshot objects can be loaded from a database for rendering. The content and relationship between the snapshot page and its snapshot objects can be fully restored. As stated above, the snapshot data is typically considered read-only. However, a user can append a new snapshot object (for example, newly created or using an existing chart) to the snapshot page which can then be updated.

In typical implementations, a snapshot is always associated with a snapshot page as a container. In other words, a generated snapshot is appended to an existing snapshot page, or a new snapshot page is created and a snapshot added to it. The user saves the snapshot page with the associated snapshot(s). A snapshot object typically must also contain a chart or an ETD pattern definition with a well-defined timeframe.

To restate, basically three data entities are involved: 1) top level is a snapshot page acting as a data container which can be transferred to someone to be analyzed. After creation it can reference individual snapshots objects; 2) each snapshot page contains references to one or more snapshot objects. A snapshot must have a valid timeframe and an ID for a chart/ETD pattern definition. After snapshot is generated it cannot be modified; 3) a read-only chart/ETD pattern definition created by other processes (for example, a forensic lab). This definition is referenced by a snapshot using a unique ID. The ID identifies which chart to use in the snapshot, while the timeframe tells from which time to which time the chart should be shown.

In typical implementations, snapshots can be relatively large from a data storage standpoint. Various data compression strategies (for example to compress log files, etc.), to the extent they are used with and as part of the described functionality, are seen as consistent with this disclosure and considered to be within the scope of the disclosure.

The illustrated, previously added-chart ("RFC Function (Client Entry) by User and System") 210 is associated with a timeframe 202 ("2015-12-29T09:51:21Z-2015-12-29T10: 51:21Z"). Other charts added to the snapshot page 200 can have the same or different timeframes (for example, to show different data distributions at the same time, show a progression of events over chronologically successive timeframes, etc.).

In some implementations, timeframe may be coupled with (or replaced by) one or more other criteria to provide a multi-dimensional snapshot page or a snapshot page based on one or more criteria other than a timeframe.

In other implementations, added charts to a snapshot page 200 can be restricted to a particular timeframe (or other criteria). For example, a particular snapshot page (for example, snapshot page 200) can contain multiple charts reflecting data all within the particular timeframe to document a potential threat or attack within the timeframe.

Add chart dialog 204 is shown with a pulldown list 206 with pre-defined chart name types. In some implementations, the UI can provide functionality (not illustrated) to enter a custom chart name/select criteria associated with the custom chart. Add chart dialog 204 also provides functionality to associate a comment 208 to an added chart. FIG. 2 also illustrates a previously added chart ("RFC Function (Client Entry) by User and System") 210 as part of the snapshot page 200.

In FIG. 2, when a new chart is added to the illustrated snapshot page 200, a UI process can provide an initial organization for the (now) two charts on the snapshot page 200. For example, the two charts could be placed side-by-side, stacked, or diagonally. The charts can also be configured as different sizes (for example, to emphasize the importance/value of one chart in relation to another), turned into interactive icons, or configured in any other way consistent with this disclosure.

Snapshot pages can also be created by, for example, adding a shared chart or other data from a forensic lab user interface (for example, 100 in FIG. 1) or other related UI (particular GUI controls are not illustrated, but could include buttons, menus, radio boxes, or other types of GUI controls).

In some implementations, charts can be organized by a user/process into different positions on the snapshot page 200, as desired. In some implementations, the snapshot page 200 can also be configured with one or more sub-pages to allow charts to be segregated into desired groupings (for example, by data type, timeframe, etc.) to increase readability, data organization, etc. In these implementations, GUI controls (not illustrated) can be provided to "add a sub-page" (for example, a control associated with functionality 212) and to navigate between the various pages associated with the snapshot page 200. In some implementations, it can be possible to add, remove, delete, etc. charts or change an order of charts within a snapshot page directly.

The snapshot page 200 also provides functionality 212 as GUI controls, such as "Edit," "Add Chart," "Send Snapshot," "Save," etc. Other functions consistent with this disclosure are also considered to be within the scope of this disclosure. For example, GUI controls such as "Add Pattern," "Add Object," or others could be provided.

Figure 3:
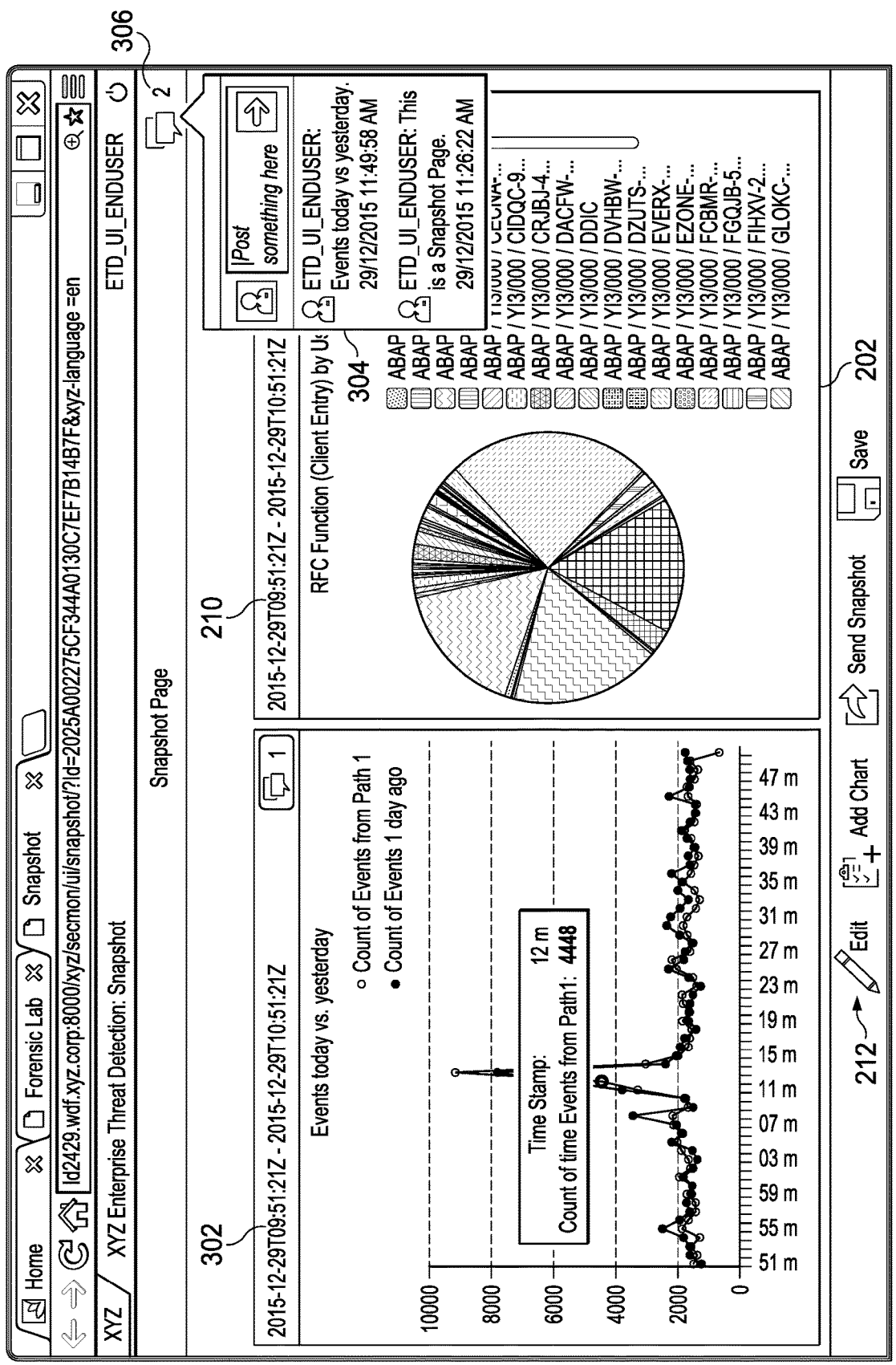
FIG. 3 is a screenshot of a snapshot page illustrating multiple associated charts and user collaboration functionality, according to an implementation.

FIG. 3 is a screenshot of a snapshot page 300 illustrating multiple associated charts and user collaboration functionality, according to an implementation. Along with chart 210 from FIG. 2, additional chart 302 (comparing "Events today vs. yesterday") has been added. In typical implementations, GUI functionality (not illustrated) is provided that permits organization of charts associated with a snapshot into desired positions.

Consistent with the description in FIG. 2, a chart (for example, chart 202) can be compared with one or more other charts representing a similar situation with the same time period but different starting time stamp. For example, in FIG. 3, chart 302 can be used to compare the selected timeframe from chart 202 from FIG. 2 with the same timeframe twenty-four hours earlier.

User collaboration dialog 304 provides functionality for a user to post a comment associated with the snapshot page 300. GUI control 306 is an example control used to open the collaboration dialog 304. For example, the user collaboration dialog 304 can be used to allow a back-and-forth collaboration between colleagues about a particular snapshot page. Colleagues with proper permissions to edit a snapshot page can, for example, add additional charts, re-organize existing charts, create new sub-pages, generate a new snapshot entirely, etc.

Figure 4:
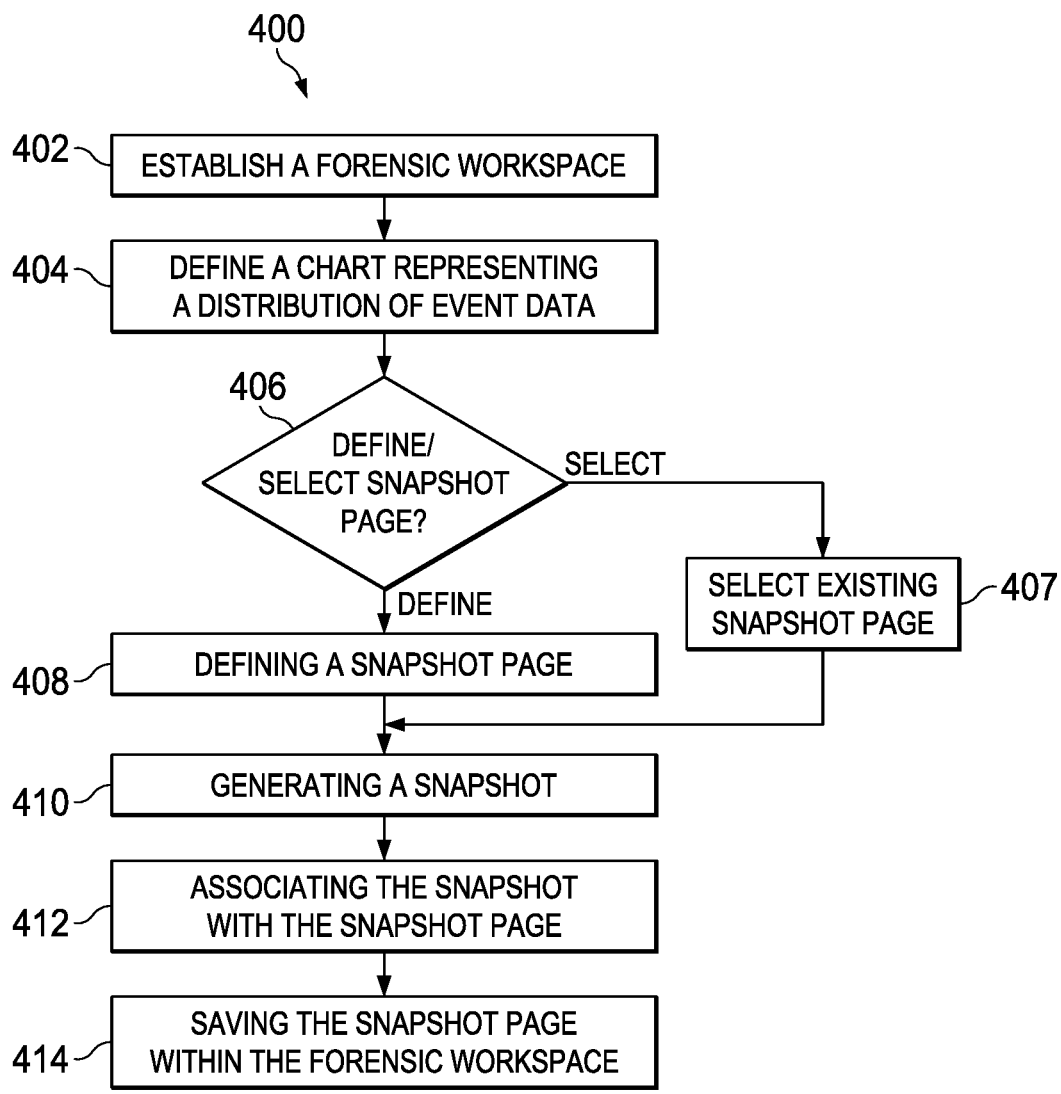
FIG. 4 is a flowchart of an example method for generating a snapshot of an ETD forensic investigation, according to an implementation.

FIG. 4 is a flowchart of an example method 400 for generating a snapshot of an ETD forensic investigation, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402, an enterprise threat detection (ETD) forensic workspace is established according to a particular timeframe and permitting defining a selection of data types from available log data for an evaluation of events associated with one or more entities. From 402, method 400 proceeds to 404.

At 404, a chart is defined illustrating a graphical distribution of a particular data type in the forensic workspace. In typical implementations, the chart includes a structured query language (SQL) SELECT statement for selecting events from the available log data and a user interface (UI) permitting interactive functionality with the chart. From 404, method 400 proceeds to 406.

At 406, a determination is made whether to define a new snapshot page or to select an existing snapshot page. If the determination is to define a new snapshot page, method 400 proceeds to 408. If the determination is to select an existing snapshot page, method 400 proceeds to 407, where an existing snapshot page is selected where a snapshot containing the defined chart can be appended. From 407, method 400 proceeds to 410.

At 408, a snapshot page is defined for containing a snapshot associated with the chart. In typical implementations, the snapshot page is a data container that is persisted with a reference to the snapshot stored in a data store. From 408, method 400 proceeds to 410.

At 410, a snapshot associated with the chart is generated, the snapshot saving a copy of all data necessary to re-create the chart into an associated snapshot object. In typical implementations, the data saved by the snapshot is configured as immutable once the snapshot is generated and the snapshot includes at least one of log data, environmental variables, environmental conditions, chart data, chart UI information, a selected path and filter data or functionality to search for the same configuration of the chart at a different timeframe. From 410, method 400 proceeds to 412.

At 412, the snapshot is associated with the snapshot page. From 412, method 400 proceeds to 414.

At 414, the snapshot page is saved within the ETD forensic workspace. After 414, method 400 stops.

In typical implementations, the saved snapshot can be loaded within the ETD forensic workspace, data retrieved from the snapshot object of the snapshot associated with the saved snapshot page, and the chart re-created on the snapshot page. The saved snapshot page can be transferred to a third-party for collaborative analysis.

Figure 5:
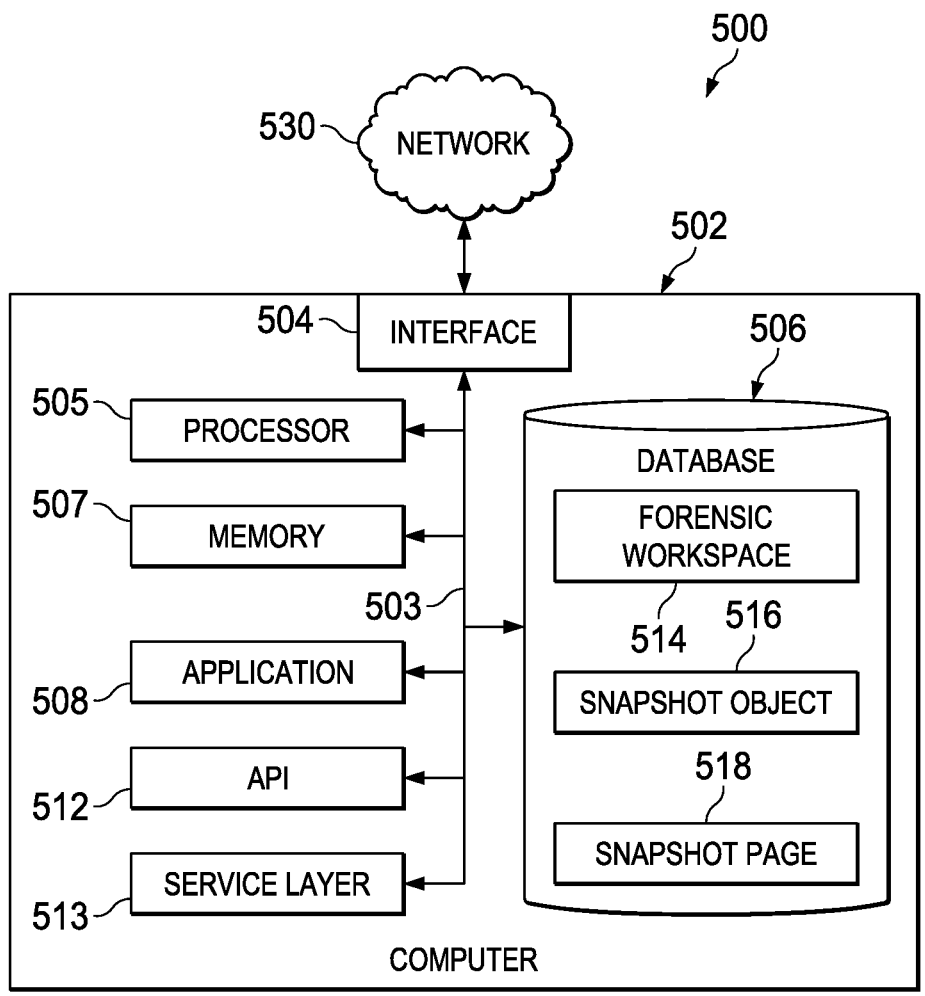
FIG. 5 is a block diagram of an exemplary computer system used to provide computational functionalities associated with described algorithms, methods, functions, processes, flows, and procedures as described in the instant disclosure, according to an implementation.

FIG. 5 is a block diagram of an exemplary computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a GUI.

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, business intelligence (BI) server, or other server (or combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530 (whether illustrated or not). Generally, the interface 504 comprises logic encoded in software or hardware (or a combination of software and hardware) and operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502. As illustrated, the database 506 contains a forensic workspace 514, snapshot object 516 and snapshot page 518 as described above.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, applications, etc. Further, although illustrated as a single application 508, the application 508 may be implemented as multiple applications 507 on the computer 502. In addition, although illustrated as integral to the computer 502, in alternative implementations, the application 508 can be external to the computer 502.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method, comprising: establishing an enterprise threat detection (ETD) forensic workspace according to a particular timeframe and permitting defining a selection of data types from available log data for an evaluation of events associated with one or more entities; defining a chart illustrating a graphical distribution of a particular data type in the forensic workspace; defining a chart illustrating a graphical distribution of a particular data type in the forensic workspace; generating a snapshot associated with the chart, the snapshot saving a copy of all data necessary to re-create the chart into an associated snapshot object; associating the snapshot with a snapshot page for containing the snapshot; and saving the snapshot page within the ETD forensic workspace.

The foregoing and other described implementations can each optionally include one or more of the following features:

A first feature, combinable with any of the following features, wherein the chart includes a structured query language (SQL) SELECT statement for selecting events from the available log data and a user interface (UI) permitting interactive functionality with the chart.

A second feature, combinable with any of the previous or following features, wherein the snapshot page is a data container that is persisted with a reference to the snapshot stored in a data store.

A third feature, combinable with any of the previous or following features, wherein the data saved by the snapshot includes at least one of log data, environmental variables, environmental conditions, chart data, chart UI information, a selected path and filter data or functionality to search for the same configuration of the chart at a different timeframe.

A fourth feature, combinable with any of the previous or following features, comprising configuring the snapshot object as immutable once the snapshot is generated.

A fifth feature, combinable with any of the previous or following features, comprising: loading the saved snapshot page within the ETD forensic workspace; retrieving data from the snapshot object of the snapshot associated with the saved snapshot page; and re-creating the chart on the snapshot page.

A sixth feature, combinable with any of the previous or following features, comprising transferring the saved snapshot page to a third-party for collaborative analysis.

In a second implementation, a non-transitory, computer-readable medium storing one or more instructions executable by a computer system to perform operations comprising: establishing an enterprise threat detection (ETD) forensic workspace according to a particular timeframe and permitting defining a selection of data types from available log data for an evaluation of events associated with one or more entities; defining a chart illustrating a graphical distribution of a particular data type in the forensic workspace; generating a snapshot associated with the chart, the snapshot saving a copy of all data necessary to re-create the chart into an associated snapshot object; associating the snapshot with a snapshot page for containing the snapshot; and saving the snapshot page within the ETD forensic workspace.

The foregoing and other described implementations can each optionally include one or more of the following features:

A first feature, combinable with any of the following features, wherein the chart includes a structured query language (SQL) SELECT statement for selecting events from the available log data and a user interface (UI) permitting interactive functionality with the chart.

A second feature, combinable with any of the previous or following features, wherein the snapshot page is a data container that is persisted with a reference to the snapshot stored in a data store.

A third feature, combinable with any of the previous or following features, wherein the data saved by the snapshot includes at least one of log data, environmental variables, environmental conditions, chart data, chart UI information, a selected path and filter data or functionality to search for the same configuration of the chart at a different timeframe.

A fourth feature, combinable with any of the previous or following features, comprising one or more instructions to configure the snapshot object as immutable once the snapshot is generated.

A fifth feature, combinable with any of the previous or following features, comprising one or more instructions to: load the saved snapshot page within the ETD forensic workspace; retrieve data from the snapshot object of the snapshot associated with the saved snapshot page; and re-create the chart on the snapshot page.

A sixth feature, combinable with any of the previous or following features, comprising one or more instructions to transfer the saved snapshot page to a third-party for collaborative analysis.

In a third implementation, a computer-implemented system, comprising: a computer memory; and a hardware processor interoperably coupled with the computer memory and configured to perform operations comprising: establishing an enterprise threat detection (ETD) forensic workspace according to a particular timeframe and permitting defining a selection of data types from available log data for an evaluation of events associated with one or more entities; defining a chart illustrating a graphical distribution of a particular data type in the forensic workspace; generating a snapshot associated with the chart, the snapshot saving a copy of all data necessary to re-create the chart into an associated snapshot object; associating the snapshot with a snapshot page for containing the snapshot; and saving the snapshot page within the ETD forensic workspace.

The foregoing and other described implementations can each optionally include one or more of the following features:

A first feature, combinable with any of the following features, wherein the chart includes a structured query language (SQL) SELECT statement for selecting events from the available log data and a user interface (UI) permitting interactive functionality with the chart.

A second feature, combinable with any of the previous or following features, wherein the snapshot page is a data container that is persisted with a reference to the snapshot stored in a data store.

A third feature, combinable with any of the previous or following features, wherein the data saved by the snapshot includes at least one of log data, environmental variables, environmental conditions, chart data, chart UI information, a selected path and filter data or functionality to search for the same configuration of the chart at a different timeframe.

A fourth feature, combinable with any of the previous or following features, further configured to configure the snapshot object as immutable once the snapshot is generated.

A fifth feature, combinable with any of the previous or following features, further configured to: load the saved snapshot page within the ETD forensic workspace; retrieve data from the snapshot object of the snapshot associated with the saved snapshot page; and re-create the chart on the snapshot page.

A sixth feature, combinable with any of the previous or following features, further configured to transfer the saved snapshot page to a third-party for collaborative analysis.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    establishing an enterprise threat detection (ETD) forensic workspace according to a particular timeframe and permitting defining a selection of data types from available log data for an evaluation of events associated with one or more entities, wherein the forensic workspace is configured with functionality to define a filter path containing a series of filters to define a particular sub set of the available log data;
    defining a chart illustrating a graphical distribution of a particular data type in the forensic workspace;
    generating a snapshot associated with the chart, the snapshot saving a copy of all data necessary to re-create the chart into an associated snapshot object;
    associating the snapshot with a snapshot page for containing the snapshot; and
    saving the snapshot page within the ETD forensic workspace.

2. The computer-implemented method of claim 1, wherein the chart includes a structured query language (SQL) SELECT statement for selecting events from the available log data and a user interface (UI) permitting interactive functionality with the chart.

3. The computer-implemented method of claim 1, wherein the snapshot page is a data container that is persisted with a reference to the snapshot stored in a data store.

4. The computer-implemented method of claim 1, wherein the data saved by the snapshot includes at least one of log data, environmental variables, environmental conditions, chart data, chart UI information, a selected path and filter data or functionality to search for the same configuration of the chart at a different timeframe.

5. The computer-implemented method of claim 1, comprising configuring the snapshot object as immutable once the snapshot is generated.

6. The computer-implemented method of claim 1, comprising:
    loading the saved snapshot page within the ETD forensic workspace;
    retrieving data from the snapshot object of the snapshot associated with the saved snapshot page; and
    re-creating the chart on the snapshot page.

7. The computer-implemented method of claim 1, comprising transferring the saved snapshot page to a third-party for collaborative analysis.

8. A non-transitory, computer-readable medium storing one or more instructions executable by a computer system to perform operations comprising:
    establishing an enterprise threat detection (ETD) forensic workspace according to a particular timeframe and permitting defining a selection of data types from available log data for an evaluation of events associated with one or more entities, wherein the forensic workspace is configured with functionality to define a filter path containing a series of filters to define a particular sub set of the available log data;
    defining a chart illustrating a graphical distribution of a particular data type in the forensic workspace;
    generating a snapshot associated with the chart, the snapshot saving a copy of all data necessary to re-create the chart into an associated snapshot object;
    associating the snapshot with a snapshot page for containing the snapshot; and
    saving the snapshot page within the ETD forensic workspace.

9. The non-transitory, computer-readable medium of claim 8, wherein the chart includes a structured query language (SQL) SELECT statement for selecting events from the available log data and a user interface (UI) permitting interactive functionality with the chart.

10. The non-transitory, computer-readable medium of claim 8, wherein the snapshot page is a data container that is persisted with a reference to the snapshot stored in a data store.

11. The non-transitory, computer-readable medium of claim 8, wherein the data saved by the snapshot includes at least one of log data, environmental variables, environmental conditions, chart data, chart UI information, a selected path and filter data or functionality to search for the same configuration of the chart at a different timeframe.

12. The non-transitory, computer-readable medium of claim 8, comprising one or more instructions to configure the snapshot object as immutable once the snapshot is generated.

13. The non-transitory, computer-readable medium of claim 8, comprising one or more instructions to:
    load the saved snapshot page within the ETD forensic workspace;
    retrieve data from the snapshot object of the snapshot associated with the saved snapshot page; and
    re-create the chart on the snapshot page.

14. The non-transitory, computer-readable medium of claim 8, comprising one or more instructions to transfer the saved snapshot page to a third-party for collaborative analysis.

15. A computer-implemented system, comprising:
    a computer memory; and
    a hardware processor interoperably coupled with the computer memory and configured to perform operations comprising:
        establishing an enterprise threat detection (ETD) forensic workspace according to a particular timeframe and permitting defining a selection of data types from available log data for an evaluation of events associated with one or more entities, wherein the forensic workspace is configured with functionality to define a filter path containing a series of filters to define a particular subset of the available log data;
        defining a chart illustrating a graphical distribution of a particular data type in the forensic workspace;
        generating a snapshot associated with the chart, the snapshot saving a copy of all data necessary to re-create the chart into an associated snapshot object;
        associating the snapshot with a snapshot page for containing the snapshot; and saving the snapshot page within the ETD forensic workspace.

16. The computer-implemented system of claim 15, wherein the chart includes a structured query language (SQL) SELECT statement for selecting events from the available log data and a user interface (UI) permitting interactive functionality with the chart.

17. The computer-implemented system of claim 15, wherein the snapshot page is a data container that is persisted with a reference to the snapshot stored in a data store.

18. The computer-implemented system of claim 15, wherein the data saved by the snapshot is configured as immutable once the snapshot is generated and wherein the snapshot includes at least one of log data, environmental variables, environmental conditions, chart data, chart UI information, a selected path and filter data or functionality to search for the same configuration of the chart at a different timeframe.

19. The computer-implemented system of claim 15, further configured to:
    load the saved snapshot page within the ETD forensic workspace;
    retrieve data from the snapshot object of the snapshot associated with the saved snapshot page; and
    re-create the chart on the snapshot page.

20. The computer-implemented system of claim 15, further configured to transfer the saved snapshot page to a third-party for collaborative analysis.

* * * * *